US011053898B2

(12) United States Patent
Omori et al.

(10) Patent No.: US 11,053,898 B2
(45) Date of Patent: Jul. 6, 2021

(54) SADDLE RIDING VEHICLE

(71) Applicant: HONDA MOTOR CO., LTD., Tokyo (JP)

(72) Inventors: Kenichi Omori, Wako (JP); Katsunori Komuro, Wako (JP); Yoshiteru Oikawa, Wako (JP); Tatsuya Kawate, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 250 days.

(21) Appl. No.: 16/267,937

(22) Filed: Feb. 5, 2019

(65) Prior Publication Data

US 2019/0242343 A1     Aug. 8, 2019

(30) Foreign Application Priority Data

Feb. 7, 2018  (JP) .............................. JP2018-019754

(51) Int. Cl.
  *F02M 37/04*    (2006.01)
  *F02M 39/02*    (2006.01)
  (Continued)

(52) U.S. Cl.
  CPC .............. *F02M 39/02* (2013.01); *B62J 35/00* (2013.01); *B62K 11/04* (2013.01); *F01L 1/053* (2013.01);
  (Continued)

(58) Field of Classification Search
  CPC ......... F02M 39/02; F02M 55/02; B62J 35/00; B62K 11/04; F01L 1/053; F01L 2001/0537
  (Continued)

(56) References Cited

U.S. PATENT DOCUMENTS

| | | | |
|---|---|---|---|
| 6,907,865 B1 * | 6/2005 | Hanby | F02M 37/50 123/509 |
| 7,082,916 B2 * | 8/2006 | Kurosawa | F01L 1/267 123/188.17 |

(Continued)

FOREIGN PATENT DOCUMENTS

| | | | | |
|---|---|---|---|---|
| JP | 2006290129 A | * | 10/2006 | ............. B62K 11/04 |
| JP | 2008163756 A | * | 7/2008 | ............. F02B 61/02 |

(Continued)

OTHER PUBLICATIONS

Office Action dated Jul. 31, 2020 issued over the corresponding Indian Patent Application No. 201914004721.

*Primary Examiner* — Hung Q Nguyen
*Assistant Examiner* — Anthony Donald Taylor, Jr.
(74) *Attorney, Agent, or Firm* — Carrier Blackman & Associates, P.C.; Joseph P. Carrier; William D. Blackman

(57) ABSTRACT

A saddle riding vehicle includes: a body frame; a fuel tank; an upright internal combustion engine; a fuel injection device; and a high-pressure fuel pump. The high-pressure fuel pump is configured to be driven by one of an intake-side camshaft and an exhaust-side camshaft. The high-pressure fuel pump is mounted on an upper surface of a cylinder head cover in an attitude inclined rearward toward the other of the camshafts. The high-pressure fuel pump can thus be protected from disturbances from the sides, and the length of a high-pressure pipe for feeding fuel from the high-pressure fuel pump to the fuel injection device can be shortened. The vehicle protects the high-pressure fuel pump from disturbances from the sides, and prevents acceleration of vaporization of fuel by reducing heat which the high-pressure fuel pump receives from the cylinder block.

20 Claims, 7 Drawing Sheets

(51) Int. Cl.
   *B62J 35/00*   (2006.01)
   *B62K 11/04*   (2006.01)
   *F01L 1/053*   (2006.01)
   *F02M 55/02*   (2006.01)
(52) U.S. Cl.
   CPC ...... *F02M 55/02* (2013.01); *F01L 2001/0537* (2013.01)
(58) Field of Classification Search
   USPC ........................................................ 123/508
   See application file for complete search history.

(56) References Cited

U.S. PATENT DOCUMENTS

| | | | | |
|---|---|---|---|---|
| 7,234,451 B2* | 6/2007 | Betz, II | ................ | B60K 15/077 |
| | | | | 123/509 |
| 7,275,523 B2* | 10/2007 | Kimura | ................ | F02M 37/50 |
| | | | | 123/509 |
| 7,455,053 B2* | 11/2008 | Nakagawa | ......... | B01D 35/0273 |
| | | | | 123/509 |
| 7,487,855 B2* | 2/2009 | Kakinuma | ............. | B60K 28/14 |
| | | | | 180/283 |
| 7,533,904 B2* | 5/2009 | Koike | ...................... | B62J 35/00 |
| | | | | 280/833 |
| 7,537,077 B2* | 5/2009 | Nakashima | .............. | B62J 17/00 |
| | | | | 180/229 |
| 8,038,172 B2* | 10/2011 | Morikawa | ................ | B62J 35/00 |
| | | | | 280/833 |
| 8,220,437 B2* | 7/2012 | Yamada | ............... | B01D 27/005 |
| | | | | 123/509 |
| 8,448,737 B2* | 5/2013 | Hasegawa | ................ | B62J 35/00 |
| | | | | 180/219 |
| 8,584,339 B2* | 11/2013 | Mbog | .................. | B60K 15/077 |
| | | | | 29/464 |
| 8,801,039 B2* | 8/2014 | Karube | .................... | B62J 37/00 |
| | | | | 280/833 |
| 9,751,393 B2* | 9/2017 | Nakata | .................... | F28F 9/001 |
| 10,151,238 B2 | 12/2018 | Mukohara | | |
| 2001/0018932 A1* | 9/2001 | Tokunaga | ................ | B62J 35/00 |
| | | | | 137/565.34 |
| 2002/0035989 A1* | 3/2002 | Iitaka | ...................... | F02B 63/06 |
| | | | | 123/509 |
| 2004/0200652 A1* | 10/2004 | Hara | ........................ | B62J 35/00 |
| | | | | 180/219 |
| 2005/0126546 A1* | 6/2005 | Yagisawa | ............... | F02M 37/50 |
| | | | | 123/509 |
| 2007/0221164 A1* | 9/2007 | Ashida | .................. | F02B 23/101 |
| | | | | 123/267 |
| 2008/0230037 A1* | 9/2008 | Fujita | .................... | F02M 37/10 |
| | | | | 123/509 |
| 2009/0218152 A1* | 9/2009 | Oohashi | .................. | B60K 13/02 |
| | | | | 180/68.3 |
| 2009/0241891 A1* | 10/2009 | Tsubakino | .............. | F01L 1/022 |
| | | | | 123/193.5 |
| 2015/0041232 A1* | 2/2015 | Takatsuka | .............. | B62K 19/38 |
| | | | | 180/219 |
| 2016/0264201 A1* | 9/2016 | Inomata | ................ | B60T 8/1706 |
| 2017/0284288 A1* | 10/2017 | Mukohara | ............... | F01L 1/047 |

FOREIGN PATENT DOCUMENTS

| | | | | |
|---|---|---|---|---|
| JP | 2013-133003 A | | 7/2013 | |
| JP | 2014-046849 A | | 3/2014 | |
| JP | 2014190239 A | * | 10/2014 | ............ Y02T 10/12 |
| JP | 2017-180328 A | | 10/2017 | |

* cited by examiner

SADDLE RIDING VEHICLE

TECHNICAL FIELD

The present invention relates to a saddle riding vehicle provided with a high-pressure fuel pump.

BACKGROUND ART

As a saddle riding vehicle provided with a high-pressure fuel pump, there has been known a saddle riding vehicle where a high-pressure fuel pump is provided to be positioned on a side of a cylinder portion of an internal combustion engine, for example, as disclosed in Patent Document 1.

PRIOR ART DOCUMENT

Patent Document

[Patent Document 1] JP 2017-180328 A

SUMMARY OF THE INVENTION

Underlying Problem to be Solved by the Invention

In such a saddle riding vehicle, a side surface of the high-pressure fuel pump is not covered by any member, and hence it is necessary to protect the high-pressure fuel pump from disturbances such as flying pebbles from the side of the vehicle. Further, the high-pressure fuel pump is disposed on the side of the cylinder portion of the internal combustion engine, and hence it is necessary to take it into account to protect and determine a route of a high-pressure pipe for feeding fuel from the high-pressure fuel pump to a fuel injection device. Additionally, the high-pressure fuel pump is disposed on the side of the cylinder block, and hence there exists a drawback in that the high-pressure fuel pump receives heat from the cylinder block, thereby accelerating vaporization of fuel.

Means to Solve the Underlying Problem

The present invention has been made to overcome the above-mentioned drawbacks, and provides a saddle riding vehicle which comprises: a body frame having a head pipe and a pair of left and right main frame members extending rearward from the head pipe; an internal combustion engine mounted on the body frame below the pair of left and right main frame members, the internal combustion engine having a cylinder portion and a transmission chamber; a fuel injection device for injecting fuel into a combustion chamber of the internal combustion engine; and a high-pressure fuel pump driven by the internal combustion engine to feed fuel under pressure to the fuel injection device through a high-pressure pipe extending from a fuel tank; wherein: the internal combustion engine is an engine having a cylinder axis erected relative to a horizontal plane; the cylinder portion has an exhaust-side camshaft for opening and closing an exhaust valve of the combustion chamber, and an intake-side camshaft for opening and closing an intake valve of the combustion chamber; and the high-pressure fuel pump is configured to be driven by one of the intake-side camshaft and the exhaust-side camshaft, and is mounted on an upper surface of a cylinder head cover of the cylinder portion in an attitude inclined toward the other of the intake-side camshaft and the exhaust-side camshaft.

According to the present invention, space saving can be realized in a height direction. The high-pressure fuel pump can be protected from disturbances in the vehicle width direction by the fuel tank and the cylinder portion. The length of the high-pressure pipe for feeding fuel from the high-pressure fuel pump to the fuel injection device can be shortened.

In a preferred form of the invention, the cylinder portion has the exhaust-side camshaft on a front side thereof and the intake-side camshaft on a rear side of thereof; the high-pressure fuel pump is configured to be driven by the exhaust-side camshaft, and the high-pressure fuel pump is mounted on the upper surface of the cylinder head cover of the cylinder portion in an inclined attitude such that the high-pressure fuel pump is inclined rearward toward the side of the intake-side camshaft.

With such a configuration, the high-pressure fuel pump is inclined rearward such that the high-pressure fuel pump is disposed away from an exhaust port which is heated to a high temperature. Accordingly, heat which the high-pressure fuel pump receives can be reduced and hence vaporization of fuel can be suppressed.

In a preferred form of the invention, the fuel tank is positioned above the internal combustion engine and is supported by the body frame.

With such a configuration, the high-pressure fuel pump can be protected from disturbances from the upper side by the fuel tank and the cylinder portion.

In a preferred form of the invention, the high-pressure fuel pump is disposed inside an outer edge of the cylinder head cover as viewed in the direction of a cylinder axis.

With such an arrangement, the high-pressure fuel pump is disposed inside the outer edge of the head cover, and hence the high-pressure fuel pump can be protected from disturbances in both the vehicle longitudinal direction and the vehicle lateral direction by the cylinder portion.

In a further preferred form of the invention, a fuel supply passage is disposed on a rear side of the cylinder portion, the fuel supply passage being connected to a downstream side of the high-pressure pipe to supply fuel to the fuel injection device; and the high-pressure pipe is routed to be disposed within a lateral width of the cylinder portion.

With such an arrangement, the high-pressure pipe can be shortened as much as possible, and the high-pressure pipe can be protected from disturbances from the sides by the cylinder portion.

Preferably, the high-pressure pipe has a flexibility.

With such a configuration, the high-pressure pipe has a flexibility and hence the cylinder head cover can be removed from the cylinder portion without removing the high-pressure pipe and maintenance property can thereby be enhanced.

In a still preferred form of the invention, the fuel tank includes a low-pressure fuel pump for feeding fuel in the fuel tank to the high-pressure fuel pump through a low-pressure pipe; the low-pressure fuel pump has a fuel flow-out portion positioned on a lower wall of the fuel tank; the high-pressure fuel pump has its mounting seat wall and the low-pressure fuel pump has its mounting seat wall, the two mounting seat walls being provided to opposedly face each other; and the mounting seat wall of the high-pressure fuel pump is positioned forward of the mounting seat wall of the low-pressure fuel pump.

With such an arrangement, the fuel flow-out portion of the low-pressure fuel pump and the high-pressure fuel pump are disposed close to each other and hence the low-pressure pipe can be shortened as much as possible.

In a preferred form of the invention, the body frame includes a head pipe and a pair of main frame members extending obliquely rearward from the head pipe; and the high-pressure fuel pump is positioned between the pair of main frame members, and at least a part of the high-pressure fuel pump overlaps with the main frame members as viewed in a side view of a body of the vehicle.

With such an arrangement, the high-pressure fuel pump can be protected by the main frame members.

Advantageous Effects of Invention

According to the present invention, space saving in the height direction can be realized. The high-pressure fuel pump can be protected from disturbances in the vehicle width direction. The length of the high-pressure pipe for feeding fuel from the high-pressure fuel pump to the fuel injection device can be shortened. Heat which the high-pressure fuel pump receives can be reduced and hence vaporization of fuel can be suppressed.

DESCRIPTION OF THE EMBODIMENT

Figure 1:
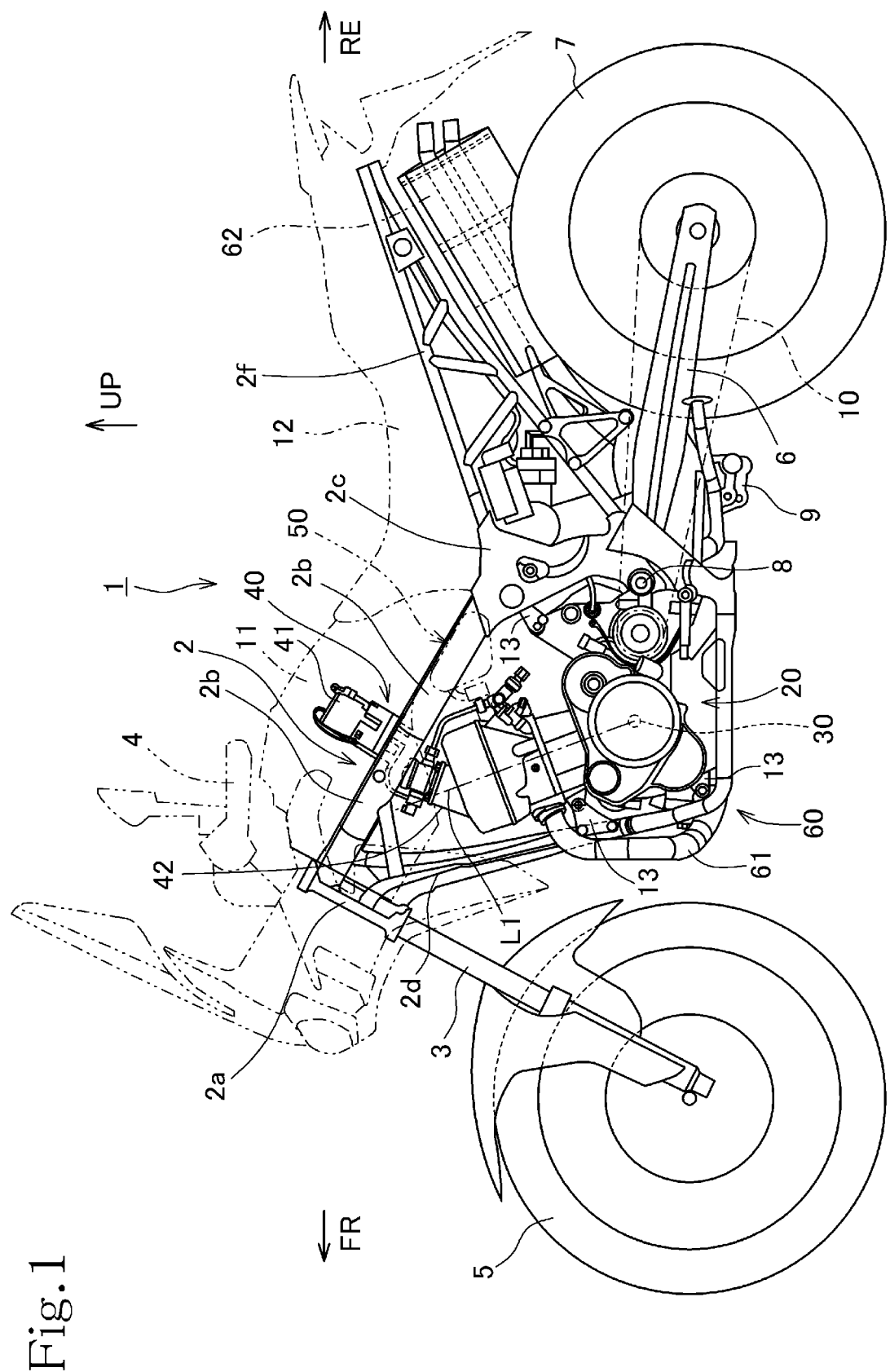
FIG. 1 is a left side view of a saddle riding vehicle according to one embodiment of the present invention.

With reference to FIG. 1 to FIG. 7, a motorcycle 1 as a saddle riding vehicle according to one embodiment of the present invention will be described.

In the description of this specification and claims, directions of front and rear, left and right, and up and down are directions of the motorcycle 1 according to this embodiment. In the drawings, an arrow FR indicates a frontward direction of the vehicle, an arrow RE indicates a rearward direction of the vehicle, an arrow LH indicates a leftward direction of the vehicle, an arrow RH indicates a rightward direction of the vehicle, and an arrow UP indicates an upward direction of the vehicle.

FIG. 1 is a left side view of the motorcycle 1 according to one embodiment of the present invention in a state where covering members and so on are removed. A body frame 2 of the motorcycle 1 includes: a head pipe 2a; a pair of left and right main frame members 2b extending obliquely rearward from the head pipe 2a; a pair of left and right center frame members 2c extending downward from rear ends of the main frame members 2b; a single down frame member 2d which extends rearward and downward from the head pipe 2a at a steep angle; a pair of left and right lower frame members 2e (see FIG. 2) which is connected to a lower end of the down frame member 2d, is bifurcated obliquely leftward and obliquely rightward, extends downward and, thereafter, is bent and extends rearward approximately horizontally, and is connected to lower ends of the pair of left and right center frame members 2c; and a seat stay 2f which extends rearward and slightly upward from upper portions and lower portions of the center frame members 2c.

A front fork 3 which supports a front wheel 5 is steerably supported by the head pipe 2a, and a steering handlebar 4 is connected to the front fork 3. A rear fork 6 which supports a rear wheel 7 is supported in a vertically swingable manner using pivot portions 8 formed on lower portions of the center frame members 2c as a fulcrum, and a cushion unit not shown in the drawings is disposed between the upper portions of the center frame members 2c and the rear fork 6 by way of a link mechanism 9.

A fuel tank 11 in which a fuel is stored is mounted on the left and right main frame members 2b, and a tandem-type seat 12 for a rider and a pillion passenger is mounted on the center frame members 2c and the seat stay 2f. The fuel tank 11 includes a low-pressure fuel pump 41 which feeds under pressure fuel stored in the fuel tank 11.

An internal combustion engine 20 is mounted on the lower frame members 2e and the center frame members 2c of the body frame 2 by way of brackets 13. The internal combustion engine 20 is positioned below the fuel tank 11, and is mounted on the motorcycle 1 in an attitude that a crankshaft 30 is directed in a vehicle width direction, and a cylinder axis L1 of an engine cylinder is inclined slightly frontward.

Figure 2:
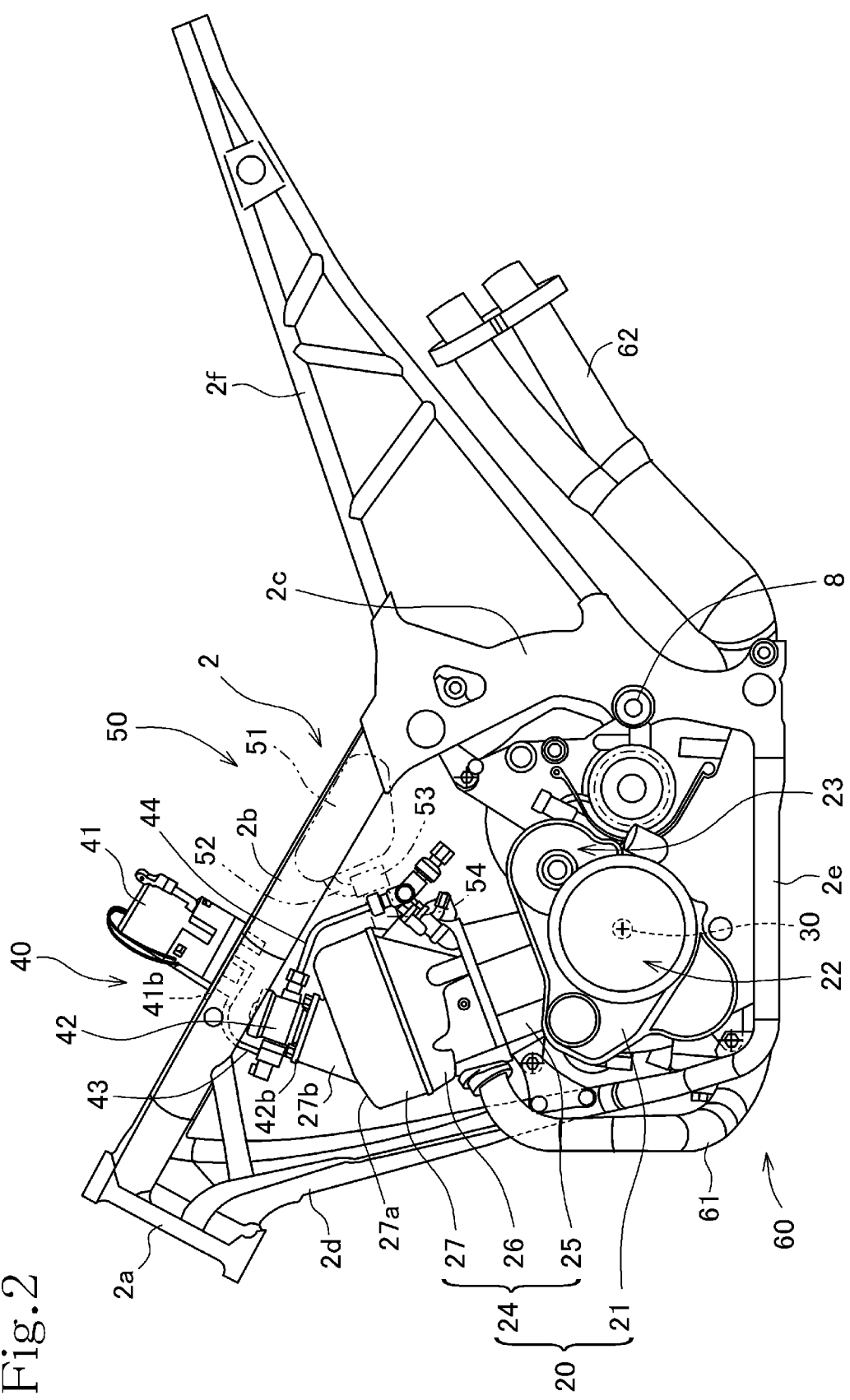
FIG. 2 is an enlarged left side view of a main part in FIG. 1.
Figure 3:
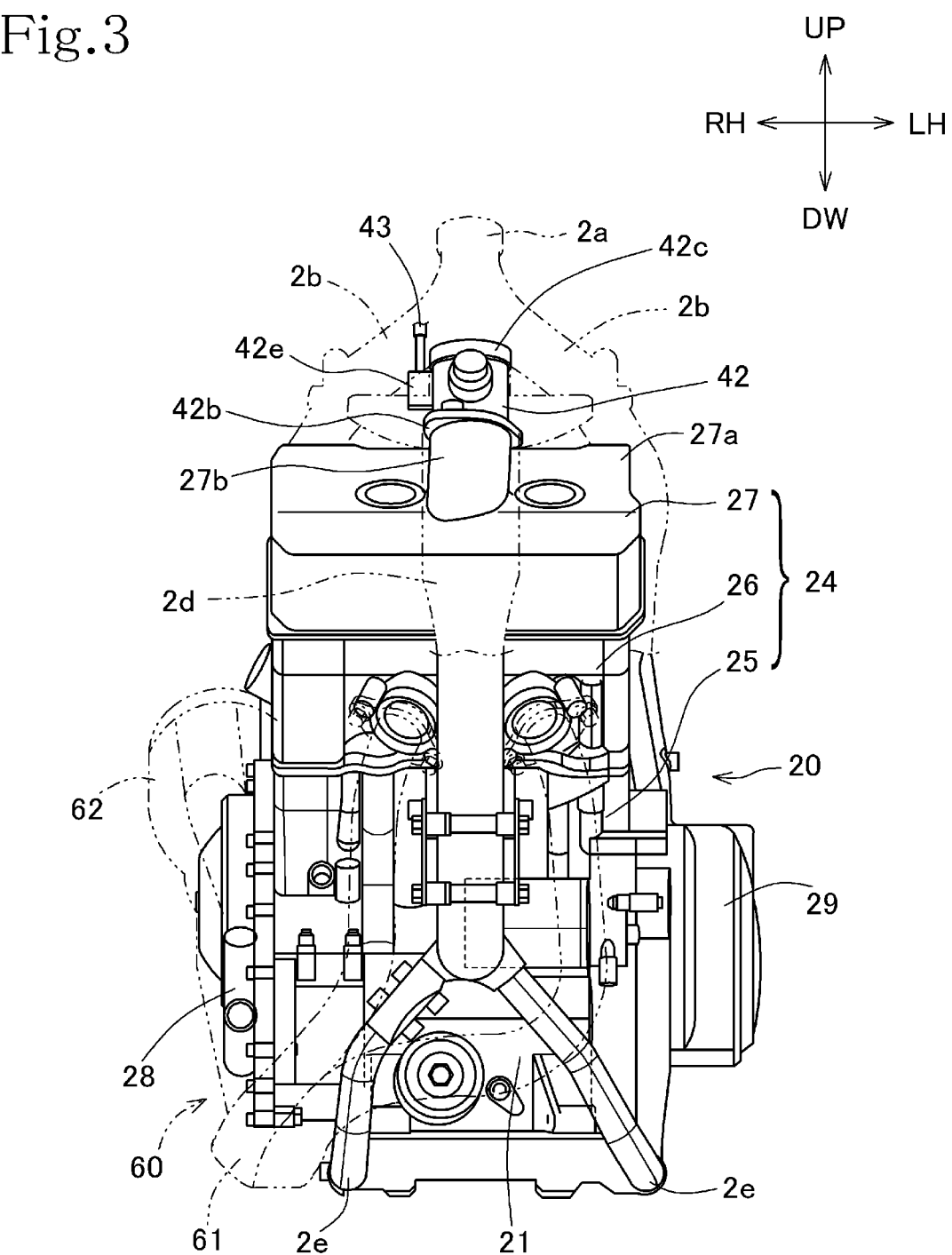
FIG. 3 is an enlarged front view of the main part in FIG. 1.

The internal combustion engine 20 is an air-cooled, two-cylinder, four-stroke cycle internal combustion engine, and is an upright internal combustion engine where the cylinder axis L1 is at an angle relative to a horizontal plane. As shown in FIG. 2 and FIG. 3, the internal combustion engine 20 is configured such that a cylinder portion 24 is made to overlap with a crankcase 21 from above, and the cylinder portion 24 is fastened and fixed to the crankcase 21 using stud bolts and the like not shown in the drawings. The cylinder portion 24 includes a cylinder block 25, a cylinder head 26, and a cylinder head cover 27 which covers an upper surface of the cylinder head 26. The cylinder block 25, the cylinder head 26, and the cylinder head cover 27 are made to sequentially put on the crankcase 21 in this order.

Figure 4:
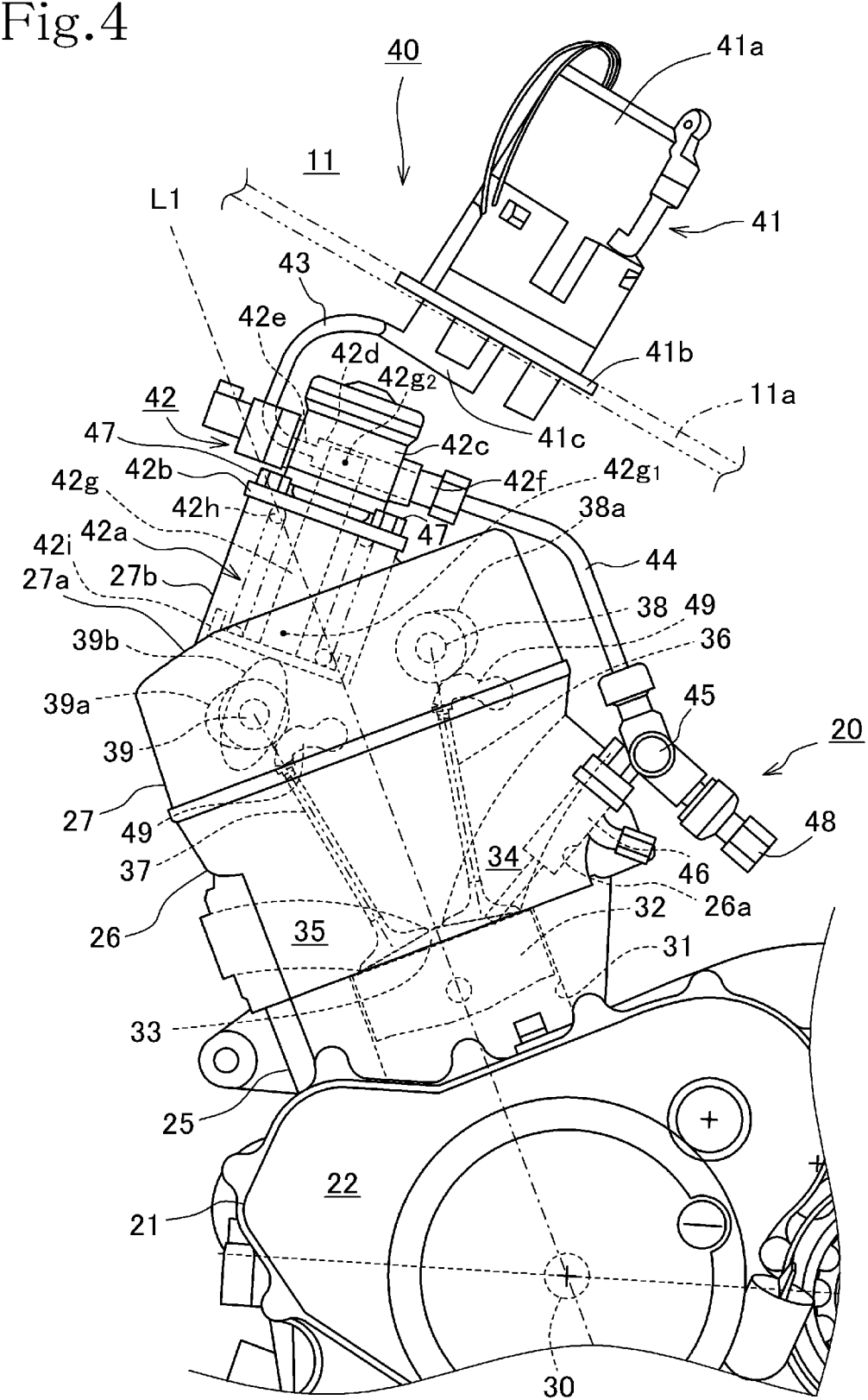
FIG. 4 is a left side view showing an internal combustion engine and a fuel supply device.
Figure 5:
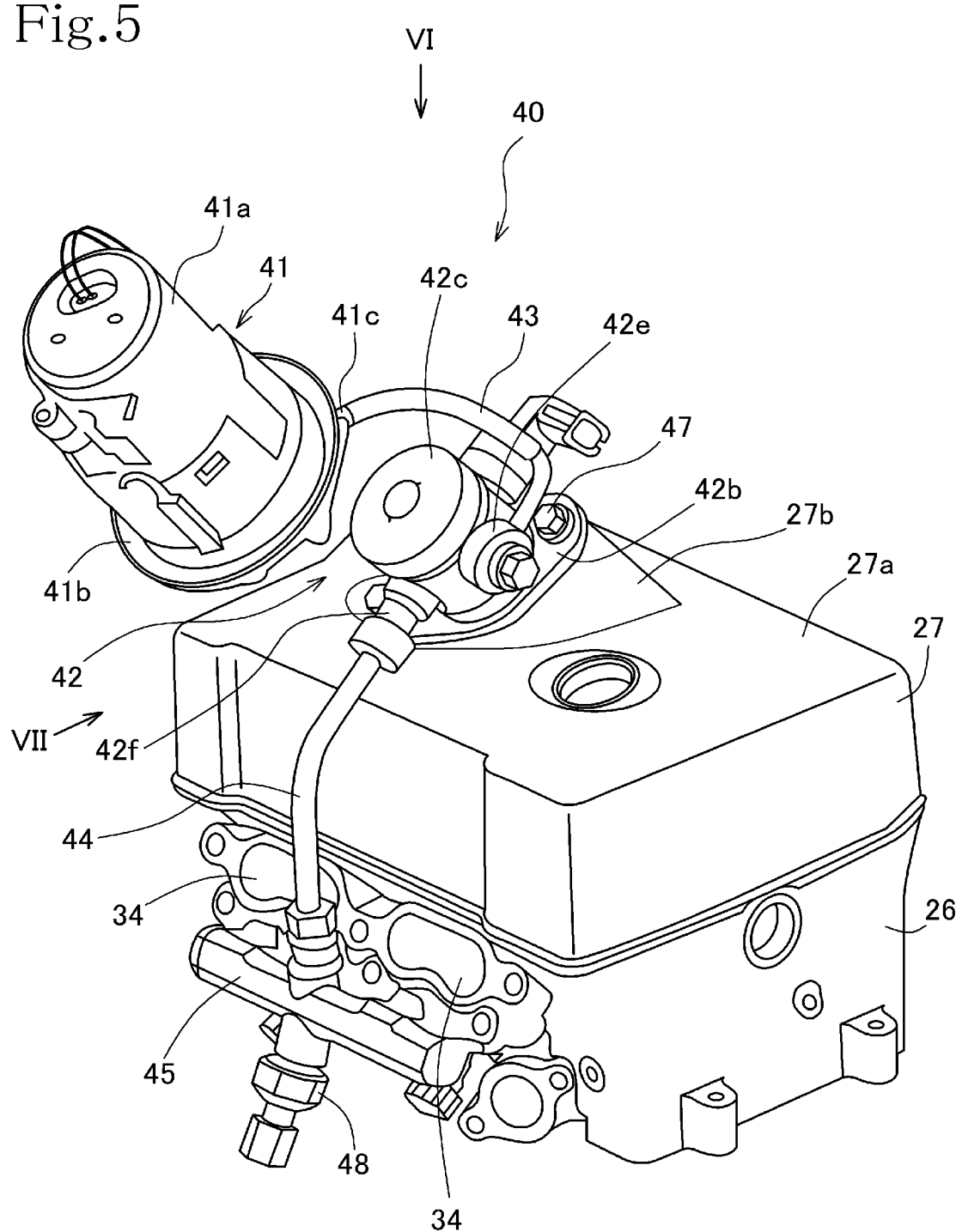
FIG. 5 is an enlarged perspective view of the main part where a cylinder head portion of the internal combustion engine and the fuel supply device are shown with a cylinder axis direction oriented in a vertical direction.

A camshaft holder not shown in the drawings is fastened and fixed to an upper portion of the cylinder head 26. As shown in FIG. 4, an intake-side camshaft 38 and an exhaust-side camshaft 39 are supported in a rotatable manner by the cylinder head 26 and the camshaft holder. As shown, the intake-side camshaft 38 is positioned on a rear side with respect to the vehicle longitudinal direction, and the exhaust-side camshaft 39 is positioned on a front side with respect to the vehicle longitudinal direction. The cylinder head 26, camshaft holder, intake-side camshaft 38, and exhaust-side camshaft 39 are covered by the cylinder head cover 27. As shown in FIG. 3, both left and right side surfaces of the crankcase 21 are covered by a right case cover 28 and a left case cover 29.

As shown in FIG. 4, two cylinder bores 31 are arranged in the cylinder block 25 in the width direction of the vehicle body, and pistons 32 slidably fitted in the respective cylinder bores 31 are connected, by way of respective connecting rods (not shown), to the crankshaft 30 which is directed in the vehicle width direction.

As shown in FIG. 4, a combustion chamber 33 is formed below a lower surface of the cylinder head 26 so as to oppose and face each of the cylinder bores 31. An intake port 34 and an exhaust port 35 which are communicated with each of the combustion chamber 33 are formed in the cylinder head 26 such that the intake port 34 and the exhaust port 35 are opposed to each other in the longitudinal direction. In the cylinder portion 24, there are provided an intake valve 36 and an exhaust valve 37 which respectively operate to make the combustion chamber 33 openably and closably communicate with the intake port 34 and the exhaust port 35, respectively. An intake cam 38a is mounted on the intake-side camshaft 38 in an integrally rotatable manner and an exhaust cam 39a is mounted on the exhaust-side camshaft 39 in an integrally rotatable manner.

The intake valve 36 and the exhaust valve 37 are brought into pressure contact with the intake cam 38a and the exhaust cam 39a respectively using springs not shown by way of rocker arms 49. When power from the crankshaft 30 is transmitted to the intake-side camshaft 38 and the exhaust-side camshaft 39 using a cam chain not shown in the drawings, the intake-side camshaft 38 and the exhaust-side camshaft 39 are rotated so that the intake valve 36 and the exhaust valve 37 are opened and closed at predetermined timings along with the rotation of the crankshaft 30.

As shown in FIG. 2, an intake device 50 is connected to the intake port 34 in a state that the intake device 50 is positioned behind or rearward of the internal combustion engine 20. The intake device 50 includes an air cleaner 51, a connecting tube 52, a throttle device 53, and an intake pipe 54. The air cleaner 51, which takes in air to be fed to the internal combustion engine 20 and operates to remove impurities, is mounted on a rear lower portion of the main frame members 2b. The throttle device 53 which regulates the volume of intake air, the intake pipe 54, and the intake port 34 of the cylinder head 26 are sequentially connected to the downstream end of the air cleaner 51 by way of the connecting tube 52. Outside air taken in the air cleaner 51 is fed to the combustion chamber 33 through the intake port 34 formed in the cylinder head 26.

An exhaust device 60 is connected to the exhaust port 35. The exhaust device 60 includes an exhaust pipe 61, a catalyst device (not shown), and a muffler 62. The exhaust pipe 61 which extends frontward is connected to the exhaust port 35. The exhaust pipe 61 extends frontward and, thereafter, is bent downward, and extends rearward below the vehicle body. Below the vehicle body, the catalyst device is mounted on a middle portion of the exhaust pipe 61. The muffler 62 is connected to a rear end of the exhaust pipe 61, and exhaust air generated in the internal combustion engine 20 is discharged from an end portion of the muffler 62 to the outside.

In the crankcase 21 of the internal combustion engine 20, a crank chamber 22 is defined on a front side, and a transmission chamber 23 for housing a transmission (not shown in the drawing) is defined on a rear side. As shown in FIG. 1, power of the internal combustion engine 20 is transmitted to the rear wheel 7 by way of the transmission and a rear wheel drive chain 10.

As shown in FIG. 1 and FIG. 4, the internal combustion engine 20 adopts a direct-injection-type fuel supply device 40 where fuel is supplied directly to the combustion chamber 33. As shown in FIG. 4, the fuel supply device 40 includes: the low-pressure fuel pump 41 which is fixed to a lower wall 11a of the fuel tank 11; a high-pressure fuel pump 42 which is mounted on the cylinder head cover 27 of the internal combustion engine 20; a fuel injection valve 46 which forms a fuel injection device for injecting fuel into the combustion chamber 33 of the internal combustion engine 20; a low-pressure pipe 43 which connects the low-pressure fuel pump 41 and the high-pressure fuel pump 42 to each other; and a high-pressure pipe 44 which is connected to the high-pressure fuel pump 42 to supply fuel to the fuel injection valve 46. The high-pressure fuel pump 42 and the high-pressure pipe 44 are detachably connected to each other. The high-pressure pipe 44 and a fuel supply passage portion 45 which is connected to a downstream end of the high-pressure pipe 44 are connected to each other by caulking so that the high-pressure pipe 44 and the fuel supply passage portion 45 cannot be removed from each other.

The low-pressure fuel pump 41 includes a body portion 41a which feeds fuel under pressure. A disc-shaped mounting seat wall 41b is formed on a lower portion of the body portion 41a for mounting the low-pressure fuel pump 41 to the fuel tank 11. A fuel flow-out portion 41c which is connected to the low-pressure pipe 43 is disposed below the mounting seat wall 41b. The low-pressure fuel pump 41 adopts the configuration where the mounting seat wall 41b is fixed to the lower wall 11a of the fuel tank 11 such that the body portion 41a is positioned in the fuel tank 11 and the fuel flow-out portion 41c protrudes downward from the fuel tank 11.

The high-pressure fuel pump 42 is a volumetric fuel pump which is driven by power of the crankshaft 30. As shown in FIG. 4, the high-pressure fuel pump 42 includes a body portion 42a. A flange-shaped mounting seat wall 42b is mounted on an upper surface of the body portion 42a, and a fuel flow passage portion 42c is disposed above the mounting seat wall 42b.

The body portion 42a of the high-pressure fuel pump 42 includes a plunger 42g, a spring 42h, and a spring seat 42i which is integrally formed with one end portion $42g_1$ of the plunger 42g. The spring 42h is fitted between the spring seat 42i and the mounting seat wall 42b, and the plunger 42g and the spring seat 42i are biased in a direction away from the mounting seat wall 42b by the spring 42h.

A fuel flow passage 42d is formed in the fuel flow passage portion 42c of the high-pressure fuel pump 42. One end of the fuel flow passage 42d forms an intake port 42e, and the other end of the fuel flow passage 42d forms a discharge port 42f. The intake port 42e is connected to the low-pressure pipe 43, and fuel fed from the low-pressure fuel pump 41 flows into the fuel flow passage 42d. A discharge port 43f is connected to the high-pressure pipe 44, and pressurized fuel is fed to the fuel injection valve 46.

A proximal or end portion $42g_2$ of the plunger 42g on the side of the fuel flow passage 42d is advanced into or retracted from the fuel flow passage 42d along with the rotation of the exhaust-side camshaft 39 as will be described later. Check valves not shown in the drawings are provided in the intake port 42e and the discharge port 42f of the fuel flow passage 42d, respectively, and the intake port 42e and the discharge port 42f are opened and closed at predetermined timings, respectively.

As shown in FIG. 4 to FIG. 7, a high-pressure fuel pump mounting portion 27b has an approximately circular cylindrical shape, into which the high-pressure fuel pump 42 is inserted, and is formed on an upper surface 27a of the cylinder head cover 27. The high-pressure fuel pump mounting portion 27b is positioned at an approximately center of the cylinder head cover 27 with respect to the vehicle width direction, and is inclined toward a rear side with respect to the upper surface 27a of the cylinder head cover 27, that is, is disposed in a rearwardly inclined attitude toward the side of the intake-side camshaft 38.

The high-pressure fuel pump 42 is configured such that the body portion 42a is inserted in the cylinder head cover 27 until the mounting seat wall 42b is brought into contact with the high-pressure fuel pump mounting portion 27b of the cylinder head cover 27, and is fixed to the cylinder head cover 27 by a pair of bolts 47. The high-pressure fuel pump 42 is mounted on the upper surface 27a of the cylinder head cover 27 of the cylinder portion 24 in an inclined attitude such that the high-pressure fuel pump 42 is inclined rearward toward the side of the intake-side camshaft 38.

As shown in FIG. 4, the high-pressure fuel pump 42 is driven by a high-pressure fuel pump drive cam 39b which is mounted on the exhaust-side camshaft 39 in an integrally rotatable manner. The plunger 42g which is biased by the spring 42h is brought into pressure contact with a cam surface of the high-pressure fuel pump drive cam 39b by way of the spring seat 42i, and the proximal or end portion $42g_2$ of the plunger 42g is advanced into or retracted from the inside of the fuel flow passage 42d along with the rotation of the exhaust-side camshaft 39.

As shown in FIG. 4, a fuel injection valve insertion hole 26a is in communication with the combustion chamber 33 and is formed in the cylinder head 26 of the internal combustion engine 20 in a direction from a rear side to a front side of the vehicle for each cylinder. The fuel injection valve 46 which forms a fuel injection device for injecting fuel into the combustion chamber 33 is inserted into the fuel injection valve insertion hole 26a.

Figure 7:
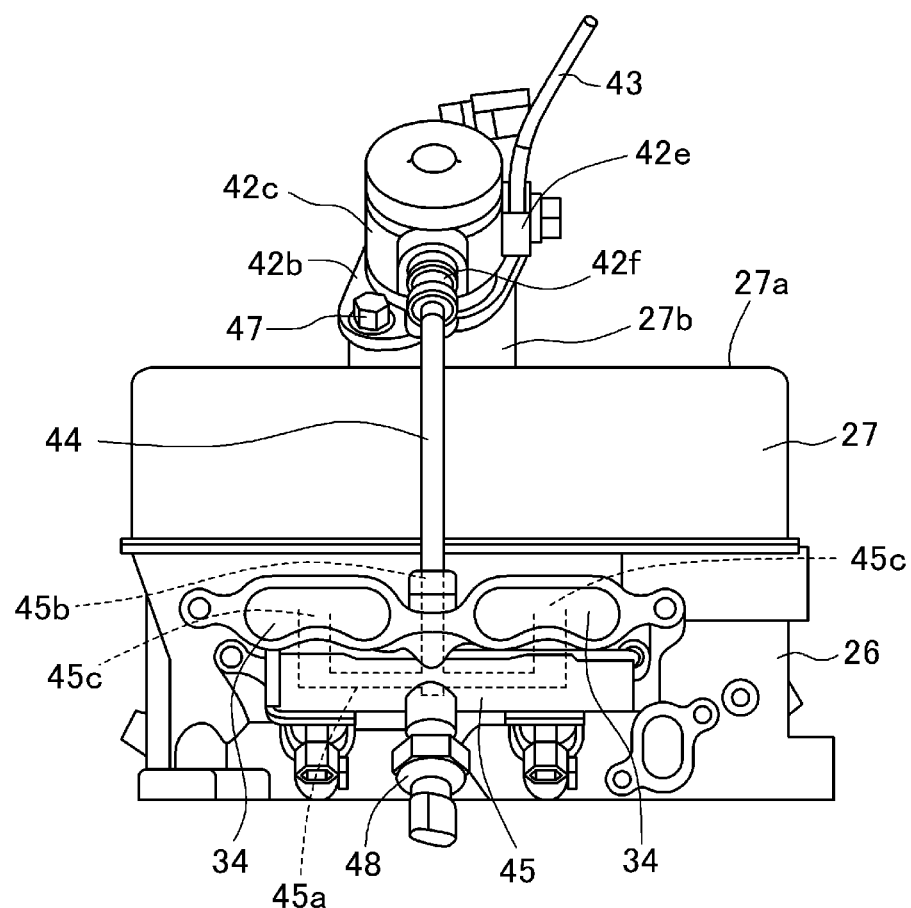
FIG. 7 is a view as viewed in a VII direction in FIG. 5.

As shown in FIG. 4 and FIG. 7, the fuel supply passage portion 45 is disposed on the side of a back or rear surface of the cylinder head 26 parallel to the crankshaft 30 in a state where the fuel supply passage portion 45 is directed in the vehicle width direction. Fuel supply passages 45a through which fuel is supplied to the fuel injection valves 46, respectively, are disposed in the fuel supply passage portion 45. An inflow port 45b of the fuel supply passages 45a is formed in an upper surface of the fuel supply passage portion 45 and at the center of the fuel supply passage portion 45 with respect to the vehicle width direction. The inflow port 45b is connected to a downstream end of the high-pressure pipe 44. The fuel supply passages 45a are in a bifurcated shape, and flow-out ports 45c are connected to the fuel injection valves 46 disposed in the respective cylinders.

The connection between the low-pressure pipe 43 and the low-pressure fuel pump 41 and the connection between the low-pressure pipe 43 and the high-pressure fuel pump 42 are respectively made by a rotatable joint. Therefore, at the time of removing the fuel tank 11 and so on, the joint is rotated so that excessive bending of the low-pressure pipe 43 can be suppressed.

As shown in FIG. 7, the high-pressure pipe 44 is routed to extend within a lateral width of the cylinder portion 24. The high-pressure pipe 44 is made using a raw material having flexibility. Accordingly, at the time of removing the cylinder head cover 27 from the cylinder head 26 for inspection or the like, it becomes unnecessary to remove the high-pressure pipe 44 from the cylinder head cover 27, thus facilitating the inspection operation.

Figure 6:
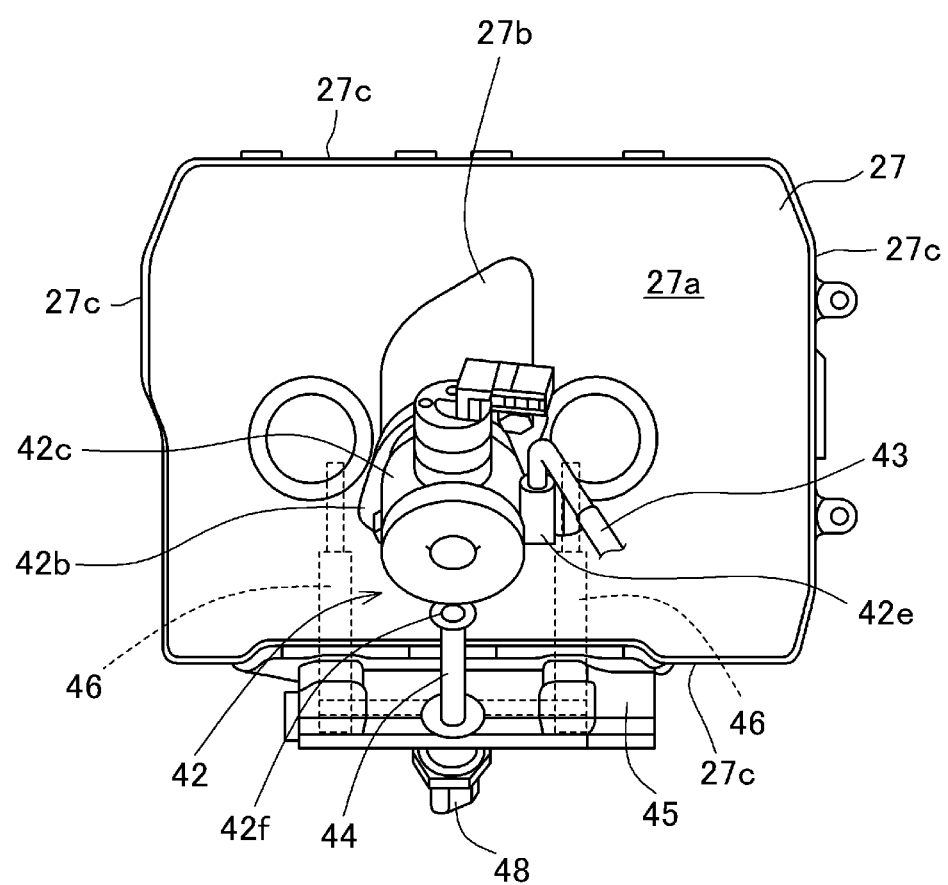
FIG. 6 is a view as viewed in a VI direction in FIG. 5.

In the state shown in FIG. 6, the high-pressure fuel pump 42 is, in a state where the high-pressure fuel pump 42 is mounted on the internal combustion engine 20, disposed inside left and right and upper and lower outer edges 27c of the cylinder head cover 27 as viewed in a direction of a cylinder axis L1.

As shown in FIG. 2, the low-pressure fuel pump 41 and the high-pressure fuel pump 42 are disposed such that the mounting seat wall 42b of the high-pressure fuel pump 42 and the mounting seat wall 41b of the low-pressure fuel pump 41 opposedly face each other, and the mounting seat wall 42b of the high-pressure fuel pump 42 is positioned in front of the mounting seat wall 41b of the low-pressure fuel pump 41.

Further, as will be noted from FIG. 3, the high-pressure fuel pump 42 is positioned between the pair of main frame members 2b. As shown in FIG. 2, the high-pressure fuel pump 42 is disposed such that at least a part of the high-pressure fuel pump 42 overlaps with the main frame members 2b as viewed in a side view of the vehicle body. Accordingly, the high-pressure fuel pump 42 is protected from disturbances such as flying pebbles from the side.

The fuel supply device 40 is configured as described above, and hence fuel is supplied to the combustion chamber 33 as follows. Pressure of fuel stored in the fuel tank 11 is increased by the low-pressure fuel pump 41 which is always operated during the operation of the internal combustion engine 20, and the fuel increased in pressure is fed to the high-pressure fuel pump 42 through the low-pressure pipe 43.

The plunger 42g of the high-pressure fuel pump 42 is advanced into and retracted from the inside of the fuel flow passage 42d, following the surface of the high-pressure fuel pump drive cam 39b which is rotated along with the exhaust-side camshaft 39, and, at the same time, the check valves provided in the intake port 42e and the discharge port 42f, respectively, are opened and closed at predetermined timings. Accordingly, the high-pressure fuel pump 42 further increases the pressure of low-pressure fuel supplied from the low-pressure fuel pump 41 and operates to discharge the fuel to the high-pressure pipe 44. The high-pressure fuel pump 42 is driven by the exhaust-side camshaft 39, but may be driven by the intake-side camshaft 38 in case the intake-side camshaft 38 and the exhaust-side camshaft 39 exchange their positions. Fuel whose pressure is increased by the high-pressure fuel pump 42 is fed to the fuel injection valves 46 through the high-pressure pipe 44 and the fuel supply passages 45a, and is injected into the combustion chambers 33 by the fuel injection valves 46, respectively.

The motorcycle 1 of this embodiment is configured as described above, and hence the motorcycle 1 can acquire the following advantageous effects.

In the vehicle or motorcycle 1 of this embodiment, the cylinder portion 24 has the exhaust-side camshaft 39 on a front side thereof and the intake-side camshaft 38 on a rear side thereof, the high-pressure fuel pump 42 is driven along with the rotation of the high-pressure fuel pump drive cam 39b mounted on the exhaust-side camshaft 39, and is mounted on the upper surface 27a of the cylinder head cover 27 of the cylinder portion 24 in an inclined manner such that the high-pressure fuel pump 42 is inclined rearward toward the side of the intake-side camshaft. Accordingly, space saving can be realized in the height direction and, at the same time, the high-pressure fuel pump 42 can be protected from disturbances in the vehicle width direction by the fuel tank 11 and the cylinder portion 24. Further, the length of the high-pressure pipe 44 for feeding fuel from the fuel tank 11 to the high-pressure fuel pump 42 can be shortened.

The cylinder portion 24 has the exhaust-side camshaft 39 on a front side thereof and the intake-side camshaft 38 on a rear side thereof, and the high-pressure fuel pump 42 is driven by the exhaust-side camshaft 39, and is mounted on the upper surface 27a of the cylinder head cover 27 of the cylinder portion 24 in an inclined attitude such that the high-pressure fuel pump 42 is inclined rearward toward the side of the intake-side camshaft 38, and hence the high-pressure fuel pump 42 is inclined rearward away from the exhaust port 35 which tends to be at a high temperature. Accordingly, heat which the high-pressure fuel pump 42 receives can be reduced, and hence vaporization of fuel can be suppressed.

The fuel tank 11 is supported by the body frame 2 at a position above the internal combustion engine 20, and hence the high-pressure fuel pump 42 can be protected from disturbances from the upper side by the fuel tank 11 and the cylinder portion 24.

The high-pressure fuel pump 42 is disposed inside the outer edges 27c of the cylinder head cover 27 as viewed in the direction of the cylinder axis L1, and hence the high-pressure fuel pump 42 can be protected from disturbances from both the vehicle longitudinal direction and the vehicle lateral direction by the cylinder portion 24.

Further, the fuel supply passage 45a, which is connected to the downstream side of the high-pressure pipe 44 and supplies fuel to the fuel injection valve 46, is disposed on the side of the back or rear surface of the cylinder portion 24, and the high-pressure pipe 44 is routed to be disposed within the lateral width of the cylinder portion 24. Consequently, the high-pressure pipe 44 can be shortened as much as possible, and the high-pressure pipe 44 can be protected from disturbances from the sides by the cylinder portion 24.

Still further, the high-pressure pipe 44 has flexibility, and hence the cylinder head cover 27 can be removed from the cylinder head 26 without removing the high-pressure pipe 44 and maintenance property can thereby be enhanced.

The fuel tank 11 includes the low-pressure fuel pump 41 which feeds fuel under pressure in the fuel tank 11 to the high-pressure fuel pump 42 through the low-pressure pipe 43, the fuel flow-out portion 41c of the low-pressure fuel pump 41 is positioned on the lower surface 11a of the fuel tank 11, the mounting seat wall 42b of the high-pressure fuel pump 42 and the mounting seat wall 41b of the low-pressure fuel pump 41 are made to opposedly face each other, and the mounting seat wall 42b of the high-pressure fuel pump 42 is positioned forward of the mounting seat wall 41b of the low-pressure fuel pump 41. Accordingly, the fuel flow-out portion 41c of the low-pressure fuel pump 41 and the high-pressure fuel pump 42 are disposed close to each other and hence the low-pressure pipe 43 can be shortened as much as possible.

Further, the body frame 2 includes the head pipe 2a and the pair of main frame members 2b extending obliquely rearward from the head pipe 2a, the high-pressure fuel pump 42 is positioned between the pair of main frame members 2b, and at least a part of the high-pressure fuel pump 42 overlaps with the main frame members 2b as viewed in a side view of the vehicle body. Accordingly, the high-pressure fuel pump 42 can be protected by the main frame members 2b.

Although one embodiment of the present invention has been described above, the present invention is not limited by the above-mentioned embodiment, and it is needless to say that the various modifications are also conceivable without departing from the gist of the present invention.

For example, the internal combustion engine for a motorcycle according to the present invention is not limited to the internal combustion engine described in the embodiment and the number of cylinders is set as desired provided that the internal combustion engine is an internal combustion engine for a motorcycle including requirements in the claims. The vehicle of the present invention is not limited to the motorcycle according to the embodiment.

REFERENCE SINGS LIST

1 . . . motorcycle
2 . . . body frame
2a . . . head pipe
2b . . . main frame member
11 . . . fuel tank
11a . . . lower surface
20 . . . internal combustion engine
23 . . . transmission chamber
24 . . . cylinder portion
27 . . . cylinder head cover
27a . . . upper surface
27c . . . outer edge
33 . . . combustion chamber
36 . . . intake valve
37 . . . exhaust valve
38 . . . intake-side camshaft
39 . . . exhaust-side camshaft
41 . . . low-pressure fuel pump
41b . . . mounting seat surface
41c . . . fuel flow-out portion
42 . . . high-pressure fuel pump
42b . . . mounting seat wall
43 . . . low-pressure pipe
44 . . . high-pressure pipe
45a . . . fuel supply passage
46 . . . fuel injection valve
L1 . . . cylinder axis

The invention claimed is:

1. A saddle riding vehicle comprising:
a body frame having a head pipe and a pair of main frame members extending rearwardly from the head pipe;
an internal combustion engine mounted on the body frame below the pair of main frame members, the internal combustion engine having a cylinder head;
a fuel injection device for injecting a fuel into a combustion chamber of the internal combustion engine; and
a high-pressure fuel pump mounted on a cylinder head cover of the internal combustion engine and driven by the internal combustion engine to feed the fuel from a fuel tank to the fuel injection device via a high-pressure fuel pipe; wherein:
the internal combustion engine has a cylinder axis erected relative to a horizontal plane;
the cylinder head has an exhaust-side camshaft for opening and closing an exhaust valve of the combustion chamber, and an intake-side camshaft for opening and closing an intake valve of the combustion chamber; and
the high-pressure fuel pump is configured to be driven by one of the intake-side camshaft and the exhaust-side camshaft, and is mounted to an upper surface of the cylinder head cover in an attitude that is inclined with respect to the upper surface of the cylinder head cover toward the other of the intake-side camshaft and the exhaust-side camshaft.

2. The saddle riding vehicle as claimed in claim 1, wherein:
the cylinder head has the exhaust-side camshaft on a front side thereof and the intake-side camshaft on a rear side thereof.

3. The saddle riding vehicle as claimed in claim 1, wherein the fuel tank is positioned above the internal combustion engine and is supported by the body frame.

4. The saddle riding vehicle as claimed in claim 1, wherein the high-pressure fuel pump is disposed inside an outer edge of the cylinder head cover as viewed in a direction of the cylinder axis.

5. The saddle riding vehicle as claimed in claim 4, wherein:

a separate fuel supply passage is connected to a downstream side of the high-pressure fuel pipe to supply the fuel to the fuel injection device; and the high-pressure fuel pipe is routed to be disposed within a lateral width of the cylinder head cover.

6. The saddle riding vehicle as claimed in claim 1, wherein the high-pressure fuel pipe has flexibility.

7. The saddle riding vehicle as claimed in claim 1, wherein:

the fuel tank includes a low-pressure fuel pump for feeding the fuel from the fuel tank to the high-pressure fuel pump via a low-pressure fuel pipe;

the low-pressure fuel pump has a fuel flow-out portion positioned on a lower wall of the fuel tank;

the high-pressure fuel pump has a mounting seat wall provided to opposedly face a mounting seat wall of the low-pressure fuel pump; and the mounting seat wall of the high-pressure fuel pump is positioned forward of the mounting seat wall of the low-pressure fuel pump as viewed in a side view of a body of the vehicle.

8. The saddle riding vehicle as claimed in claim 1, wherein:

the pair of main frame members extend obliquely and rearwardly from the head pipe; and the high-pressure fuel pump is positioned between the pair of main frame members, and at least a portion of the high-pressure fuel pump overlaps with the pair of main frame members as viewed in a side view of a body of the vehicle.

9. The saddle riding vehicle as claimed in claim 2, wherein the fuel tank is positioned above the internal combustion engine and is supported by the body frame.

10. The saddle riding vehicle as claimed in claim 2, wherein the high-pressure fuel pump is disposed inside an outer edge of the cylinder head cover as viewed in a direction of the cylinder axis.

11. The saddle riding vehicle as claimed in claim 3, wherein the high-pressure fuel pump is disposed inside an outer edge of the cylinder head cover as viewed in a direction of the cylinder axis.

12. The saddle riding vehicle as claimed in claim 2, wherein the high-pressure fuel pipe has flexibility.

13. The saddle riding vehicle as claimed in claim 3, wherein the high-pressure fuel pipe has flexibility.

14. The saddle riding vehicle as claimed in claim 2, wherein:

the fuel tank includes a low-pressure fuel pump for feeding the fuel from the fuel tank to the high-pressure fuel pump via a low-pressure fuel pipe;

the low-pressure fuel pump has a fuel flow-out portion positioned on a lower wall of the fuel tank;

the high-pressure fuel pump has a its mounting seat wall provided to opposedly face a mounting seat wall of the low-pressure fuel pump; and the mounting seat wall of the high-pressure fuel pump is positioned forward of the mounting seat wall of the low-pressure fuel pump as viewed in a side view of a body of the vehicle.

15. The saddle riding vehicle as claimed in claim 3, wherein:

the fuel tank includes a low-pressure fuel pump for feeding the fuel from the fuel tank to the high-pressure fuel pump via a low-pressure fuel pipe;

the low-pressure fuel pump has a fuel flow-out portion positioned on a lower wall of the fuel tank;

the high-pressure fuel pump has a mounting seat wall provided to opposedly face a mounting seat wall of the low-pressure fuel pump; and the mounting seat wall of the high-pressure fuel pump is positioned forward of the mounting seat wall of the low-pressure fuel pump as viewed in a side view of a body of the vehicle.

16. The saddle riding vehicle as claimed in claim 4, wherein:

the fuel tank includes a low-pressure fuel pump for feeding the fuel from the fuel tank to the high-pressure fuel pump via a low-pressure fuel pipe;

the low-pressure fuel pump has a fuel flow-out portion positioned on a lower wall of the fuel tank;

the high-pressure fuel pump has a its mounting seat wall provided to opposedly face a mounting seat wall of the low-pressure fuel pump; and the mounting seat wall of the high-pressure fuel pump is positioned forward of the mounting seat wall of the low-pressure fuel pump as viewed in a side view of a body of the vehicle.

17. The saddle riding vehicle as claimed in claim 5, wherein:

the fuel tank includes a low-pressure fuel pump for feeding the fuel from the fuel tank to the high-pressure fuel pump via a low-pressure fuel pipe;

the low-pressure fuel pump has a fuel flow-out portion positioned on a lower wall of the fuel tank;

the high-pressure fuel pump has a its mounting seat wall provided to opposedly face a mounting seat wall of the low-pressure fuel pump; and the mounting seat wall of the high-pressure fuel pump is positioned forward of the mounting seat wall of the low-pressure fuel pump as viewed in a side view of a body of the vehicle.

18. The saddle riding vehicle as claimed in claim 2, wherein:

the pair of main frame members extend obliquely and rearwardly from the head pipe; and the high-pressure fuel pump is positioned between the pair of main frame members, and at least a portion of the high-pressure fuel pump overlaps with the pair of main frame members as viewed in a side view of a body of the vehicle.

19. The saddle riding vehicle as claimed in claim 3, wherein:

the pair of main frame members extend obliquely and rearwardly from the head pipe; and the high-pressure fuel pump is positioned between the pair of main frame members, and at least a portion of the high-pressure fuel pump overlaps with the pair of main frame members as viewed in a side view of a body of the vehicle.

20. The saddle riding vehicle as claimed in claim 4, wherein:

the pair of main frame members extend obliquely and rearwardly from the head pipe; and the high-pressure fuel pump is positioned between the pair of main frame members, and at least a portion of the high-pressure fuel pump overlaps with the pair of main frame members as viewed in a side view of a body of the vehicle.

* * * * *